United States Patent [19]

Osato et al.

[11] Patent Number: 4,737,947
[45] Date of Patent: Apr. 12, 1988

[54] RECORDING MEDIUM HAVING OPTOMAGNETIC RECORDING LAYER AND OPTICAL RECORDING LAYER WITH GUIDE TRACKS OF SPECIFIC REFLECTANCE

[75] Inventors: Yoichi Osato, Yokohama; Ichiro Saito, Kawasaki, both of Japan

[73] Assignee: Canon Kabushiki Kaisha, Tokyo, Japan

[21] Appl. No.: 619,339

[22] Filed: Jun. 11, 1984

[30] Foreign Application Priority Data

Jun. 14, 1983 [JP] Japan ................. 58-105044
Jun. 14, 1983 [JP] Japan ................. 58-105045
Jul. 12, 1983 [JP] Japan ................. 58-125495
May 21, 1984 [JP] Japan ................. 59-103525

[51] Int. Cl.⁴ .............................. G11B 11/00
[52] U.S. Cl. ..................... 369/13; 360/114;
360/131; 360/59; 365/122; 430/270; 428/621;
428/636
[58] Field of Search ............. 369/13, 14, 275;
360/114, 131, 59; 346/135.1; 428/667, 636, 900,
913, 621, 447, 213; 430/270; 365/121, 122

[56] References Cited

U.S. PATENT DOCUMENTS

| | | | |
|---|---|---|---|
| 3,665,483 | 5/1972 | Becker et al. | 369/275 |
| 4,101,907 | 7/1978 | Bell et al. | 346/135.1 |
| 4,412,231 | 10/1983 | Namba et al. | 430/270 |
| 4,414,650 | 11/1983 | Ohta et al. | 365/122 |
| 4,417,290 | 11/1983 | Tanaka et al. | 369/13 |
| 4,569,881 | 2/1986 | Freese et al. | 360/131 |

FOREIGN PATENT DOCUMENTS 2077065 12/1981 United Kingdom ................. 369/13

Primary Examiner—Raymond F. Cardillo
Assistant Examiner—Hoa T. Nguyen
Attorney, Agent, or Firm—Fitzpatrick, Cella, Harper & Scinto

[57] ABSTRACT

An optical recording medium comprising a substrate, an optomagnetic recording layer made of a magnetic film where information can be recorded and reproduced by irradiation with a light beam, and an optical recording layer which can be modified in optical properties to form guide tracks when information is recorded in or reproduced from the optomagnetic recording layer.

4 Claims, 4 Drawing Sheets

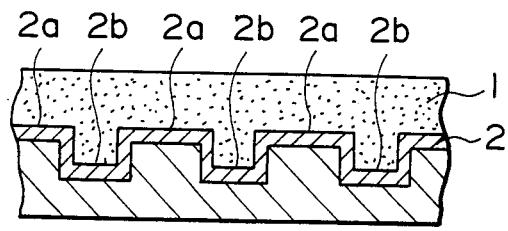
FIG. I
PRIOR ART
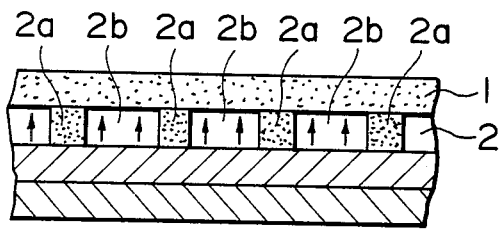
FIG. 2
PRIOR ART
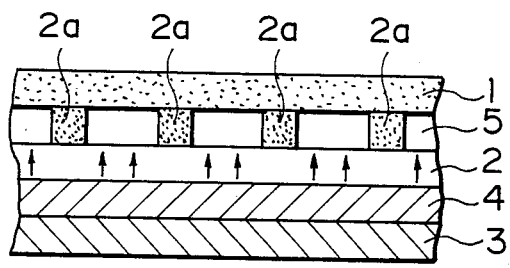
FIG. 3

RECORDING MEDIUM HAVING OPTOMAGNETIC RECORDING LAYER AND OPTICAL RECORDING LAYER WITH GUIDE TRACKS OF SPECIFIC REFLECTANCE

BACKGROUND OF THE INVENTION

1. Field of the Invention

The present invention relates to an optical recording medium where information can be recorded and reproduced by light beam irradiation.

2. Description of the Prior Art

Optical recording media for record and reproduction of information are roughly classified into three types: a reproduction-only type, postscript (direct read after write) type, and rewriting type. The reproduction-only type devices are used exclusively for reproduction, including video disk and digital audio disk (DAD) devices. The postscript (DRAW) type devices are those in which a blank is allowed to remain after recording and used for additional recording as required. The rewriting type devices permit erasing the written unnecessary information and rewriting other information.

There are known optical recording media, for example, those having a rare earth-transition metal alloy film, those based on an amorphous-to-crystalline phase transition which have a film of reducible oxide such as a chalcogen compound, heat-mode recording media, and thermoplastic recording media. Among these, representative media in which rewriting is possible include those having an optomagnetic recording layer made of a rare earth-transition metal alloy. Materials usable for the optomagnetic recording layer include, for example, polycrystalline films of MnBi and MnCuBi, amorphous films of GdCo, GeFe, TbFe, DyFe, GdTbFe, TbDyFe, GdFeCo, TbFeCo, and GdTbCo, and a single-crystal film of GIG (Gadolinium-Iron garnet).

The above optical recording media are generally provided with guide tracks for a tracking servo adjacent to recording tracks so as to track the recording tracks exactly during recording, reproducing, and erasing.

A technique for forming these guide tracks in optical recording media has been proposed, which comprises, as shown in FIG. 1, covering a groove-engraved plastic substrate 1 with an optomagnetic recording layer 2 to form guide tracks 2a and recording tracks 2b. This technique, however, is disadvantageous in that the S/N ratio is much lowered under the influence of the birefringence due to the substrate 1. Moreover, the memory density is low because the grooves are formed mechanically and when the substrate 1 is made of glass, the groove engraving requires complicated operations and a high cost.

Besides this technique, Japanese Pat. Kokai Nos. 61031/81, 61032/81, and 74854/82 have disclosed techniques which comprise, as shown in FIG. 2, forming guide tracks 2a by irradiating the optomagnetic recording layer 2 made of an amorphous magnetic film with a high power laser beam to crystallize the irradiated portions or convert them into longitudinally magnetized layers. However, it is disadvantageous that a high power laser beam is necessary to transform the amorphous magnetic film.

SUMMARY OF THE INVENTION

An object of the invention is to provide an optical recording medium in which guide tracks are formed with simple operations and information can be recorded in high density.

The above and other objects of the invention are achieved with an optical recording medium comprising a substrate, an optomagnetic recording layer made of a magnetic film where information can be recorded and reproduced by irradiation with a light beam, and an optical recording layer which can be modified in optical properties to form guide tracks when information is recorded in or reproduced from the optomagnetic recording layer.

BRIEF DESCRIPTION OF THE DRAWINGS

FIGS. 1 and 2 are partially sectional views showing the structure of optical recording media according to the prior art.

FIG. 3 is a partially sectional view showing the structure of an embodiment of the optical recording medium according to the invention.

DETAILED DESCRIPTION OF EMBODIMENTS OF THE INVENTION

Figure 4:
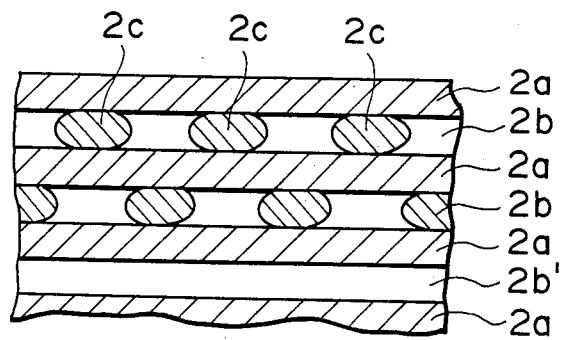
FIG. 4 is a partially enlarged plan view of the recording medium shown in FIG. 3, for illustrating the mode of forming guide tracks in the medium.

FIG. 3 is a partially sectional view illustrating the structure of an optical recording medium according to the invention. In the drawing, 1 is a substrate made of a glass, plastic thin film, or the like. The substrate 1 is overlaid with an optical recording layer 5, which in turn is overlaid with an optomagnetic recording layer 2. The optomagnetic recording layer 2 is a perpendicularly magnetized film (the direction of the magnetic field therein is perpendicular to the surface) made of an amorphous magnetic rare earth-transition metal alloy such as GdTbFe, SmTbFe, TbFe, GdDyFe, GdCo, GdTbFeCo, or HoCo, in which information is to be recorded. This optomagnetic recording layer 2 is laminated upon a supporting layer 3 through a bond layer 4. The supporting layer 3 is a thin plate made of glass, synthetic resin, metal, or the like. The optical recording layer 5 made of a material which undergoes crystallization, deformation such as perforation, or reaction with the optomagnetic recording layer 2, at an intermediate temperature between the crystallization point and recording temperature of the optomagnetic recording layer 2, thereby being modified in optical properties. An anti-reflection layer made of an inorganic or organic material can be laid between the optical recording layer 5 and the substrate 1. A transparent dielectric layer and a reflection layer can also be laid adjacently to the optomagnetic recording layer 2 on the opposite side of the light incidence.

Methods for forming the guide tracks in the structure shown in FIG. 3 are described below referring to the partially enlarged plan view shown in FIG. 4. Guide tracks 2a are first formed by modifying optical properties of parts of the optical recording layer 5 through the deformation, crystallization, or reaction with the optomagnetic recording layer 2. This is accomplished by heating parts of the optical recording layer 5 at a temperature below the crystallization point of the optomagnetic recording layer 2 which is in the range of from about 300° to about 500° C., with a light beam projected from the substrate 1 side. As shown later, the resulting guide tracks 2a are different from the recording tracks 2b in optical properties, at least in reflectance, and therefore can transmit sufficient signals for tracking.

2c represents the recorded bits on the recording tracks 2b, and 2b' represents the state of recording tracks where information is not yet recorded. The guide tracks 2a and the recording tracks 2b are not necessarily parallel in belt form. Track numbers and sector numbers for dividing the tracks into sectors may be written on the guide tracks 2a.

Figure 5:
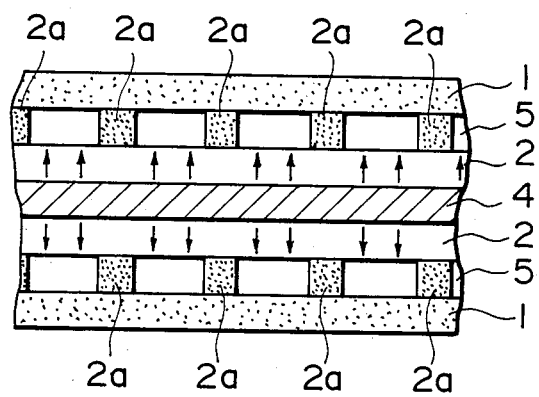
FIG. 5 is a partially sectional view showing the structure of an optical recording medium in which double-faced recording is possible according to the invention.

As shown in FIG. 5, two series of substrates 1, optical recording layers 5, and optomagnetic recording layers 2 may be laminated upon each other with a bond layer 4 interposed between the two, whereby recording, reproducing, and erasing can be carried out by projecting light beams from both sides of the laminate and the recording capacity can be doubled.

Examples of the formation of guide tracks 2a in the structure shown in FIG. 3 are given in Table 1. In these examples, optical properties of the tracks were measured with a ray of wavelength 820 nm, the optomagnetic layers 2 were made of a GdTbFe alloy, and the light beam used for the formation of guide tracks 2a was emitted from a 500-mW Ar gas laser.

TABLE 1

| Example No. | Material and thickness of optical recording layer 5 | Thickness of optomagnetic recording layer 2 | Optical property of recording track 2b | Optical property of guide track 2a | Mode of modification for the formation of guide track 2a |
| --- | --- | --- | --- | --- | --- |
| 1 | Styrene oligomer 1 μ | 300 Å | Kerr rotation angle ca. 0.4 deg. Reflectance 40% | Kerr rotation angle ca. 0 deg. Reflectance 38% | Deformation occurred in the interface between layers 5 and 2 |
| 2 | Selenium-Antimony alloy 3000 Å | 1500 Å | Reflectance 30% | Reflectance 40% | Crystallization of layer 5 |
| 3 | Bismuth iodide 3000 Å | 2000 Å | Kerr rotation angle ca. 0.4 deg. Reflectance 35% | Kerr rotation angle ca. 0 deg. Reflectance 30% | Reaction of layers 5 and 2 |

Good record and reproduction could be achieved by using the recording media of these examples.

In the structure shown in FIG. 3, the optical recording layer 5 can function also as an anti-reflection layer for reducing the reflectance from the optomagnetic recording layer 2. The reflectance of the writing or reading light from the optomagnetic recording layer 2 made of an amorphous magnetic material is about 50% as measured with the light projected through the substrate 1 of glass, synthetic resin, or the like. In such a case, the reflectance of the light can be reduced to about 10- about 20% by making the optical recording layer 5 from a material having a refractive index of about 2.0 for the writing or reading light.

Table 2 shows examples of the medium provided with an optical recording layer having an anti-reflecting function as stated above. In these examples, glass (1.2 mm thick) was used for the substrate 1, a GdTbFeCo alloy for the optomagnetic recording layer, and a 500-mW Ar gas laser beam for the formation of guide tracks. The reflectance was measured with a ray of wavelength 820 nm.

TABLE 2

| Example No. | Material and thickness of optical recording layer 5 (anti-reflection layer) | Reflectance of recording track 2b (%) | Reflectance of guide track 2a (%) | Mode of modification to form guide track 2a |
| --- | --- | --- | --- | --- |
| 4 | Ge—phthalocyanine 1200 Å | 30 | 38 | Perforation |
| 5 | Se—Sb alloy 1000 Å | 25 | 35 | Crystallization |
| 6 | Se—As—Te Alloy 900 Å | 18 | 40 | Crystallization and perforation |
| 7 | 1st layer MgF$_2$ 1500 Å 2nd layer Se—Sb 1000 Å 3rd layer MgF$_2$ 1500 Å | 12 | 34 | Crystallization of 2nd layer of Se—Sb |
| 8 | 1st layer PS* 1400 Å 2nd layer ZnS 1000 Å 3rd layer PS* 1400 Å | 17 | 28 | Deformation or separation of PS* layer and ZnS layer |

Note
*PS = polystyrene

These guide tracks indicated reflectances of at least about 30-40% and sufficient tracking signals could be obtained therefrom. For the purpose of reducing the power of the light source for forming guide tracks 2a, a polyarylate film 0.3μ thick was laid between the substrate 1 and the optical recording layer 5. The materials used for the optical recording layers 5 of examples 4, 5, and 6 having the thickness shown in Table 2 showed absorptivities of about 10% for a ray of wavelength 820 nm and therefore gave good results for recording and reproduction.

Figure 6:
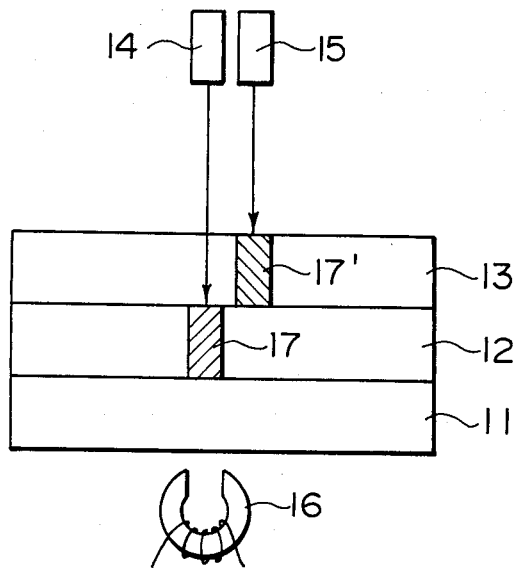
FIGS. 6 and 8 are partially sectional views showing the structure of optical recording media according to the invention having an optical recording layer in which information can also be recorded.

Further it is possible in the invention to record not stripes of guide tracks as shown in FIG. 4 but bits as information signals in the optical recording layer 5 and to utilize these lines of recorded bits as guide tracks for the optomagnetic recording layer. Methods for recording and reproducing in this case are illustrated below referring to FIG. 6 which shows a schematic sectional view of the recording medium illustrated in Table 3 according to the invention. A glass or plastic substrate 11 is overlaid by the sputtering or vacuum deposition method with an optomagnetic recording layer 12 500–3000 Å thick made of an amorphous magnetic alloy such as GdCo, GdTbFe, or TbDyFe. Then an optical recording layer 13 is made thereon from a material which, on irradiation with a light beam, melts or vaporizes to form pits or undergoes thermal modification to alter optical properties. That is, the optical recording layer 13 is made to a thickness of 100–3000 Å by a method such as vapor deposition from Se-BiF$_3$, Te-BiF$_3$, Pb-BiF$_3$, Se-TeO$_2$, Te-TeO$_2$, or Pb-TeO$_2$. Recording in this type of medium is carried out by irradiating it with a light beam 14 of specific wavelength not absorbable by the optical recording layer but absorbable by the optomagnetic recording layer and with a light beam 15 of specific wavelength absorbable by the optical recording layer. A semiconductor laser beam of wavelength about 800 nm is suited for the light beam 14 and laser beams of wavelengths about 400–700 nm, e.g. an Ar gas laser beam and an He-Ne laser beam, are suited for the light beam 15. Bits 17 are recorded as units of information by irradiation with the light beam 14 while applying a magnetic field to the optomagnetic recording layer 12 by means of a magnetic head 16. Bits 17' are also recorded as units of information in the optical recording layer 13 by irradiation with the light beam 15 to produce pits or phase transition. Information units 17 recorded in the optomagnetic recording layer 12 are read out by utilizing the Kerr effect of a light beam on the layer 12. Information units 17' recorded in the optical recording layer 13 are read out as the difference in reflectivity between the written and unwritten areas by irradiating these areas with a light beam.

For reading recorded bits 17, recorded bits 17' can be utilized as guide tracks to apply signals to the track servo, and for reading recorded bits 17', recorded bits 17 can be similarly utilized as guide tracks.

The recorded bits 17 and 17', since different in the mode of recording, can be distinguished in the reproduction system, so that no mis-tracking due to the confusion of these bits results.

Thus both optical recording and optomagnetic recording are possible in this type of recording medium and hence memory density can be increased without narrowing the pitch of tracks in each of the recording layers.

This invention can be applied to optical recording media of the air-sandwich structure or the laminate structure. It is also possible to interpose a heat insulation layer made of e.g. an organic resin or a layer which is made of a high refractive index dye or pigment and is transparent to the working light, between the writing-light incidence side substrate and either the optical recording layer or the optomagnetic recording layer. For the purpose of preventing the degradation of the recording medium, the protective layer can be arranged which is made of a metal such as Ti, Cr, Zn, Al, or Si or an oxide such as TiO$_2$, Al$_2$O$_3$, SiO, SiO$_2$, or Cr$_2$O$_3$. An anti-reflecting monolayer of ZrO$_2$, SiO, TiO$_2$, Ta$_2$O$_5$, or SiO$_2$ or an anti-reflecting multilayer of a ZnS film and either an MgF$_2$ film or Na$_3$AlF$_6$ film alternately laminated upon each other can be laid between the writing-light incidence side substrate and either the optical recording layer or the optomagnetic recording layer or between the optical recording layer and the optomagnetic recording layer. The layer for bonding the recording-layer-supporting substrate with the protective substrate can be made of; an anticorrosive layer containing a volatile or oil-soluble rust preventive (corrosion inhibitor); a layer containing a powder of metal such as Al, Sn, Zn, Ti, or Cr; a layer containing a desiccant such as MgO, BaO, CaO, Al$_2$O$_3$, CaCl$_2$, KOH, NaOH, CaSO$_4$.$\frac{1}{2}$H$_2$O, SiO$_2$.xH$_2$O, P$_2$O$_5$, activated alumina, Mg(ClO$_4$)$_2$, or ZnBr$_2$ powder; or a layer containing an organic base such as 2,4,6-trimethylpyridine, sodium dimethylaminoglycine, tris(hydroxymethyl)aminomethane, or 2-amino-2-methyl-1,3-propanediol.

Figure 7:
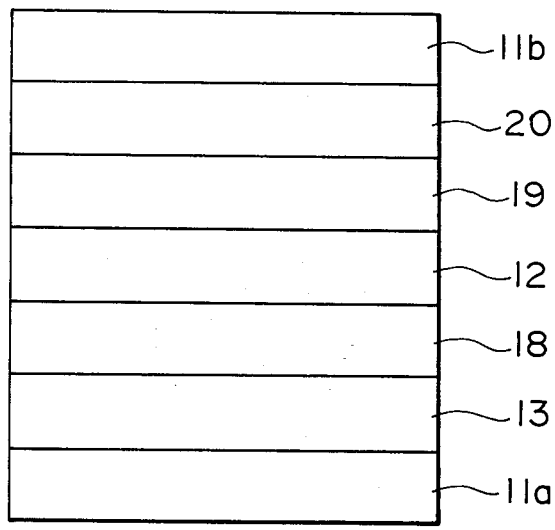
FIGS. 7 and 9 are partially sectional views showing the structure of an optical recording medium which is provided with some auxiliary layers.

FIG. 7 shows an embodiment of the optical recording medium which has such auxiliary layers as mentioned above in addition to the same layers as of Example 7. This optical recording medium was prepared as follows: A glass substrate 11a was overlaid in series with; a 1000-Å thick optical recording layer 13 of Se-BiF$_3$ by the two-source vapor deposition process; a 2000-Å thick anti-reflection layer 18 of ZrO$_2$ by electron beam heating in a vacuum deposition apparatus; a 1500-Å thick optomagnetic recording layer 12 of Gd$_{12}$Tb$_{12}$Fe$_{76}$ by sputtering in a high-frequency sputtering apparatus; a 3000-Å thick protective layer 19 of SiO by vapor deposition for preventing the optomagnetic recording layer 12 from oxidation; a bond layer 20; and a protective substrate 11b of glass.

The light beam 14 used for recording bits in the optomagnetic recording layer 12 was a 10-mW output laser beam of wavelength 820 nm and the light beam 15 used for recording bits in the optical recording layer 13 was a 12 mW output laser beam of wavelenth 633 nm. The optical recording layer 13 of Se-BiF$_3$ has a nature not absorbing the laser beam of 820 nm but absorbing the laser beam of 633 nm. Writing in the optomagnetic recording layer was carried out by applying an about 500-Oe bias magnetic field thereto. Both writing and reading were conducted at 1 MHz of a frequency of recording signals. The laser beams used for reading were of wavelength 820 nm from a 6-mW output laser and of wavelength 633 nm from a 6-mW output laser. Reproduction signals of about 200 mV (p-p value) were gained from the optomagnetic recording layer 12 and reproduction signals of about 800 mV (p-p value) from the optical recording layer 13.

Figure 8:
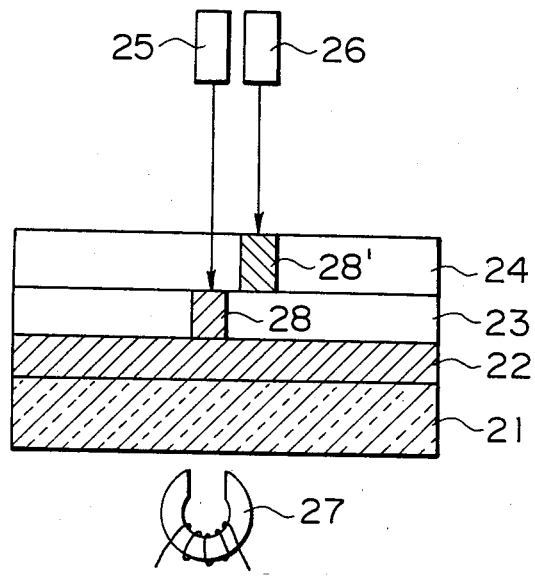

According to the invention, a reflection layer can be arranged on the side of the optomagnetic recording layer 23 opposite to the light incidence side as shown in FIG. 8 and the S/N ratio upon reading the information recorded in the optomagnetic recording layer can be improved by utilizing not only the magnetooptic Kerr effect but also the Faraday effect. This recording medium was prepared as follows: a 300–700 Å thick glass or plastic substrate 21 was overlaid in series with; a reflection layer 22 of Al, Au, Ag, Cu, or the like by sputtering, vacuum deposition, or the like; an optomagnetic recording layer 23 made of an amorphous magnetic alloy such as GdCo, GdTbFe, TbFeCo, TbDyFe, or GdTbFeCo 80–300 Å thick by sputtering, vacuum deposition, or the like; and an optical recording layer 24 made of a substance such as Se-BiF$_3$, Te-BiF$_3$, Pb-BiF$_3$, Se-TeO$_2$, Te-TeO$_2$, Sb$_2$Se$_3$-SiO, or Pb-TeO$_2$, which, on irradiation with a laser beasm, melts and vaporizes forming pits or undergoes a thermal modification to alter optical properties, by vapor deposition or the like to a thickness of 100–3000 Å so as to absorb the light beam of specific wavelength. The record and reproduction of information were carried out, similarly to Example 7 by irradiating the recording medium with a light beam 25 of specific wavelength not absorbable by the optical recording layer but absorbable by the optomagnetic recording layer and with a light beam 26 of specific wavelength absorbable by the optical recording layer. Recording in the optomagnetic recording layer was conducted by using a magnetic head 27. Recorded bits 28 or 28' in one of the recording layers were utilized as guide tracks for recording or reproducing information in or from the other one of the recording layers.

Figure 9:
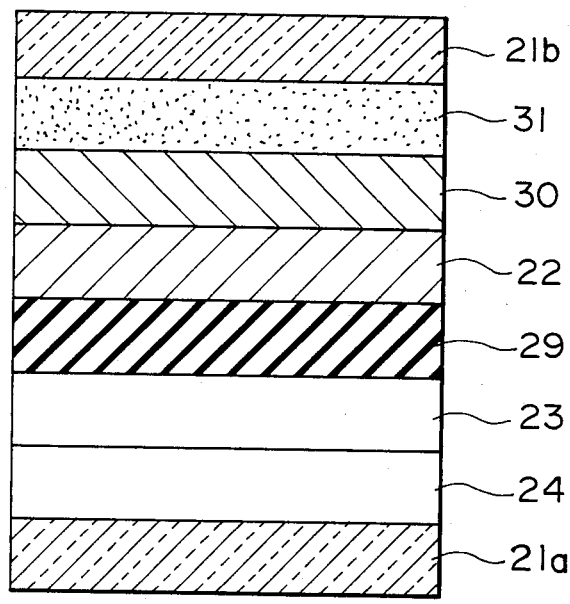

In another embodiment of the optical recording medium according to the invention, a dielectric layer made of SiO, SiO$_2$, ZnS, AlN, Si$_2$N$_3$, TiO$_2$, or the like is interposed between such a reflection layer as stated above and an optomagnetic recording layer. An example of this type of recording medium is shown in FIG. 9. This was prepared as follows: A glass substrate 21a was overlaid in series with; an optical recording layer 24 of Se-BiF$_3$ 1000 Å thick by the two-source vapor deposition method; an optomagnetic recording layer 23 of Gd$_{12}$Tb$_{12}$Fe$_{76}$ 140 Å thick by sputtering in a high-frequency sputtering apparatus; a dielectric layer 29 of SiO about 500 Å thick by the electron beam vapor deposition method; a reflection layer 22 of Cu about 400 Å thick by the electron beam vapor deposition method; a protective layer 30 of SiO 3000 Å thick by vapor deposition for preventing the optomagnetic recording layer from oxidation; a bond layer 31; and a protective substrate 21b of glass.

The light beam 25 used for recording bits in the optomagnetic recording layer 23 was a 10-mW output laser beam of wavelength 820 nm and the light beam 26 used for recording bits in the optical recording layer 24 was a 12-mW output laser beam of wavelength 633 nm. The optical recording layer 24 of Se-BiF$_3$ has a nature not absorbing the laser beam of 820 nm but absorbing the laser beam of 633 nm. Writing in the optomagnetic recording layer was carried out by applying an about 500 Oe bias magnetic field thereto. Both writing and reading were conducted at 1 MHz a frequency of recording signals. The laser beams used for reading were of wavelength 820 nm from a 6-mW output laser and of wavelength 633 nm from a 6-mW output laser. Reproduction signals of about 200 mV (p-p value) were gained from the optomagnetic recording layer 23 and reproduction signals of about 800 mV (p-p value) from the optical recording layer 24.

Further, optical recording media of the types shown in FIGS. 7 and 9 were prepared by using materials for optomagnetic recording layer and for the optical recording layer as shown in Table 3. The prepared recording media were subjected to recording and reproducing tests using laser beams as shown in Table 3, giving good results.

TABLE 3

| Material for optomagnetic recording layer (A) | Wavelength of laser beam for (A) (nm) | Material of optical recording layer (B) | Wavelength of laser beam for (B) (nm) |
| --- | --- | --- | --- |
| GdCo | 820 | Se—BiF$_3$ | 633 |
| GdTbFe | 820 | Te—TeO$_2$ | 633 |
| TbDyFe | 820 | Pb—BiF$_3$ | 633 |
| TbDyFe | 820 | Pb—TeO$_2$ | 633 |
| TbFeCo | 820 | Sb$_2$Se$_3$—SiO | 633 |

What is claimed is:

1. An optical recording medium comprising:
    (a) a transparent substrate;
    (b) an optomagnetic recording layer composed of a magnetic thin film provided on the substrate where information can be recorded or reproduced by irradiation with a light beam; and
    (c) an optical recording layer in contact with said optomagnetic recording layer, provided between the substrate and said optomagnetic recording layer, said optical recording layer having an absorptivity of about 10% with regard to the light beam, wherein reflectance of said optical recording layer is changed by deformation, crystallization or reaction at a temperature between the crystallization point of said optomagnetic recording layer and the temperature of said optomagnetic recording layer at the time when information is recorded thereon, thereby forming guide tracks.

2. The optical recording medium of claim 1, wherein the optical recording layer acts as a layer for reducing the reflection of the light beam from the optomagnetic recording layer.

3. The optical recording medium of claim 1, wherein the guide tracks are lines of bits recorded in the optical recording layer.

4. The optical recording medium of claim 3, wherein the optical recording layer and the optomagnetic recording layer absorb light of different wavelengths and information is recorded in these layers with light beams of different wavelengths.

* * * * *